AUTOMATIC BRAKE CONTROL SYSTEM

Original Filed July 25, 1962 4 Sheets-Sheet 1

BERNARD B. THOMPSON
DONALD J. O'CONNELL
INVENTORS

BY G. T. Ogden
ATTORNEY

AUTOMATIC BRAKE CONTROL SYSTEM

Original Filed July 25, 1962 4 Sheets-Sheet 2

BERNARD B. THOMPSON
DONALD J. O'CONNELL
INVENTORS

BY

ATTORNEY

AUTOMATIC BRAKE CONTROL SYSTEM

Original Filed July 25, 1962 4 Sheets-Sheet 3

BERNARD B. THOMPSON
DONALD J. O'CONNELL
INVENTORS

BY

ATTORNEY

AUTOMATIC BRAKE CONTROL SYSTEM

Original Filed July 25, 1962 4 Sheets-Sheet 4

BERNARD B. THOMPSON
DONALD J. O'CONNELL
INVENTORS

BY
ATTORNEY

United States Patent Office

Re. 27,168
Reissued Sept. 20, 1971

27,168

AUTOMATIC BRAKE CONTROL SYSTEM

Bernard B. Thompson, Bainbridge Island, Wash., Donald J. O'Connell, deceased, late of Pacoima, Calif.. by Frances M. O'Connell, administratrix, Mission Hills, Calif., assignors to Crane Co., Chicago, Ill.

Original No. 3,245,213, dated Apr. 12, 1966, Ser. No. 217,509, July 25, 1962. Application for reissue Feb. 7, 1967, Ser. No. 642,610

(Filed under Rule 47(a) and 35 U.S.C. 116)

Int. Cl. B60t *8/08*

U.S. Cl. 303—21 37 Claims

Matter enclosed in heavy brackets [ ] appears in the original patent but forms no part of this reissue specification; matter printed in italics indicates the additions made by reissue.

*ABSTRACT OF THE DISCLOSURE*

*A braking system for vehicle wheels utilizing the rotational speed of the most rapidly rotating wheel to furnish a comparison standard governing the application of braking effort to the wheels. The system includes means for withholding this comparison standard from a locked or skidding wheel and operates to apply decreasing braking effort to any wheel rotating at a speed less than that of the fastest rotating wheel. If all wheels decelerate too rapidly, a memory or reference means initiates relaxation of all brakes until some wheel attains a speed approaching the fastest wheel speed just prior to skidding.*

*Rotational wheel speeds are sensed by transducer means operatively associated with the respective braked wheels and including a coil energized by D.C. which is modulated by A.C. generated as the wheel rotates and having a frequency proportional to rotational speed. A wave potential, preferably of square wave form, produced therefrom is employed, in the case of the fastest rotating wheel, to charge capacitive means to a potential representing the rotational speeds of the respective wheels and which potential is permitted to decay at a desired rate such as the fastest normal deceleration rate selected as optimum for that vehicle. An output signal to brake application control means is produced which is inversely proportional to the frequency of the speed signal sensed for the associated wheel and this signal is employed to relax the brake to an extent proportional to the magnitude of the output signal thereby permitting the wheel to recover from an overbraked condition.*

This invention relates to braking systems for vehicles having independent wheels, and more particularly to braking control means for attaining optimum efficiency and safety in braking operations with vehicles such as aircraft operating under conditions and upon surfaces presenting widely variable braking problems.

It is well recognized that the most efficient and effective method of braking a wheeled vehicle is to apply maximum friction drag to the wheels without causing the tires to skid on the supporting surface. In practice the achievement of ideal braking automatically has been difficult if not impossible since the application of the requisite braking force to each vehicle wheel must vary with the rotational speed and the coefficient of friction between the wheel and the runway. The coefficient of friction varies widely depending on construction materials, temperature and weather conditions. The coefficient of friction also has an important effect on the time required for a non-rotating wheel, as well as an excessively braked wheel rotating at less than the linear speed of the vehicle, to re-accelerate into synchronism with the linear speed of the aircraft. A rotational wheel speed corresponding with the linear velocity of the craft is known as the "synchronous speed" of the wheel. Since the tire is somewhat elastic, it will deflect and slip at the leading and trailing edges of the footprint under severe braking conditions. For this reason, synchronous speed as used in this application will be understood to be the wheel speed at which the major portion of the tire footprint does not slip with respect to the supporting surface as determined by the maximum coefficient developed. It is not necessarily the same as that calculated from the rolling radius of the tire. If an airfield runway is wet or icy, a wheel can easily be locked by application of the brake due to the low coefficient of friction; for the same reason, a locked wheel may require a considerably longer period to accelerate to synchronous speed after release of the brake than under dry runway conditions. The time required for a wheel to recover or accelerate to synchronous speed after excessive braking action is of considerable importance since the brakes are most effective when applied while the wheel is rotating at a synchronous speed.

Another feature of importance is the provision of automatic means to assure release of the brakes so long as the landing wheels are out of contact with the ground while airborne or while bouncing in "touching down" on the landing field. The reason for this is that it might be disastrous for a plane to land with locked wheels. It might be equally serious if the brakes could be applied while the plane is in mid-air during a bounce from the runway.

With the previously mentioned desirable characteristics of braking systems in view, it is an object of the present invention to provide improvements in vehicle braking systems whereby substantially optimum braking is automatically attained irrespective of variations in coefficients of friction with time during vehicle deceleration and irrespective of contemporaneous differences in coefficients of friction of the traction surfaces at different wheels of the vehicle.

Another object of the invention is the provision of [a] rugged *in proximity to and* wheel-speed sensing means housed within a weather-tight compartment and energized by direct current to generate a sinusoidal wave signal having a frequency proportional to actual wheel speed at any instant.

Another object of the invention is the provision of a braking system utilizing individual wheel speed sensors for each wheel for generating a frequency modulated signal indicative of true wheel speed which signals can be employed separately or in combination to determine instantaneously effective braking at each wheel and the degree of slip.

It is another object of the invention to provide a simple, lightweight, multi-wheel braking system specially adapted for use upon any of a variety of types of aircraft or other wheeled vehicles.

Other objects and advantages of the invention will hereinafter be made evident in conjunction with the appended claims and the description of the presently preferred embodiment of the invention illustrated in the accompanying drawings, in which drawings:

The system in general

For illustrative purposes, the invention will be described as applied to a conventional airplane having port and starboard wheels, but as will be made evident, the invention is applicable to other vehicles and particularly to aircraft having more than two such independent wheels.

Figure 1:
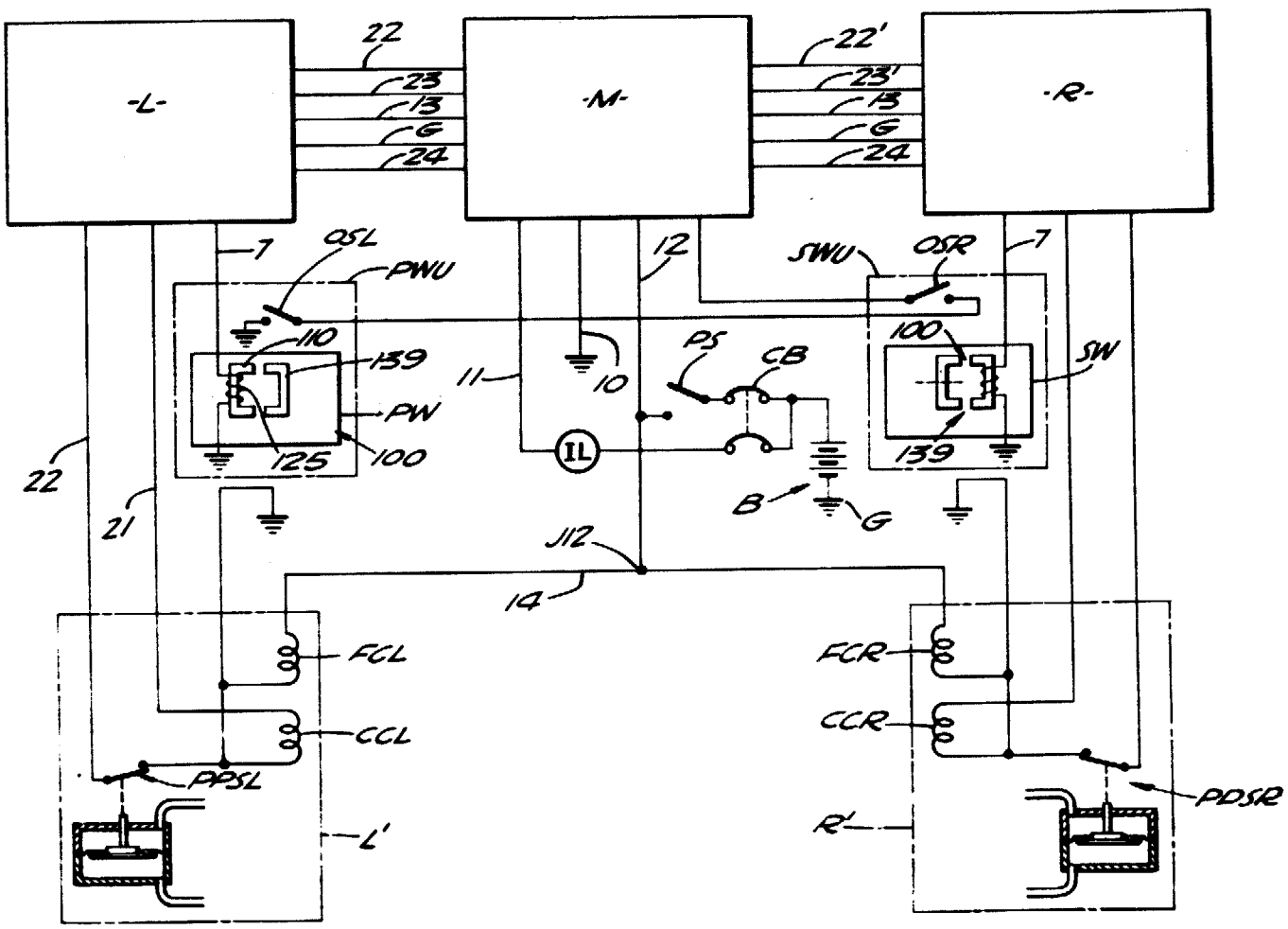
FIGURE 1 is a simplified schematic diagram of the braking system for an airborne vehicle having two principal load-supporting wheels.

Referring now to FIGURE 1, there is indicated in a dot-dash rectangle a port wheel unit PWU located at a port-wheel PW of the braking system; and similarly in a dot-dash rectangle a starboard wheel unit SWU located at a starboard-wheel SW. Also indicated in FIGURE 1 are major sets of components L, L′ and R, R′, each associated with a respective one of the port and starboard wheels although it is pointed out these are or may be physically positioned in any suitable location in the vehicle. Also shown is an apparatus unit M comprising control components common to all wheel-units on the system. Connected to units PWU, M and SWU are certain auxiliaries including a pilot switch PS, a circuit breaker CB, an indicator lamp IL, and a suitable battery B for furnishing electric power to the system. Since the apparatuses in units PWU, L, and L′ are substantially identical or complementary to those in units SWU, R and R′, respectively, detailed descriptions of the circuits and functions of these will hereinafter be limited in general to those associated with port wheel PW, it being understood that each principal wheel of the vehicle will normally be equipped with similar units similarly connected to the common unit M and to battery B.

The system of the present invention includes means to prevent application of the brakes until or unless a substantial fraction of the weight of the craft is supported by the wheels; and includes means which, after the wheels have attained synchronous speed (tread speed substantially equal to ground speed), utilizes the rotational speed of the most rapidly rotating wheel to furnish a comparison standard governing the application of braking effort to the several wheels of the craft following depression of the brake pedal by the pilot. The system also includes means for withholding this comparison standard from a locked or skidding wheel. The apparatus operates to apply decreasing braking pressure or effort to any wheel rotating at a speed less than that of the fastest-rotating wheel, the function of furnishing the comparison standard shifting automatically from wheel to wheel as the vehicle decelerates if necessary to satisfy the stated condition. However, in the event all wheels decelerate too rapidly, as where all wheels lock and skid, a memory or reference means in the apparatus then initiates relaxation of all brakes until some wheel attains a speed nearly equal to the fastest wheel speed just prior to the skidding.

Rotational speeds of the individual wheels are channeled to respective speed-sensing means by individual wheel-driven transducer means which modulates a continuous electric current at a varying frequency proportional to the instantaneous wheel speed. The thus modulated signal comprises a D.C. component and an A.C. component having a frequency in proportion to the wheel speed. The speed sensing means utilizes the A.C. component to produce an intermittent D.C. current and therefrom a "square wave" potential which is used intermittently to charge an associated capacitive circuit to a potential proportional to the rotational speed of the wheel providing the signal. Thus the several capacitive means of the individual wheel speed sensing circuits store respective charges the potentials of which at any moment represent the immediately previous rotational speeds of the respective wheels.

The memory or reference means common to all the wheel speed-sensing circuits comprises a reference including a capacitor maintained charged to a potential proportional to (or substantially equal to) the contemporaneous potential of the particular individual wheel-circuit capacitors which is highest in potential. That is, the reference capacitor is furnished a charge which under ordinary circumstances is representative of the immediately previous rotational speed of the fastest rotating wheel. Thus as relative wheel speeds change, the reference capacitor charge may be furnished first by one and then by another of the wheel speed-sensing circuits, but at any time by that one corresponding to the then fastest wheel. In this manner there is provided in the reference capacitor a reference potential which varies but is repetitively revised at each of successive brief intervals of time. The reference capacitor circuit includes means whereby that capacitor may discharge relatively slowly in comparison with the capacitors in the several speed-sensing circuits, the rate of discharge preferably being adjusted to correspond to the fastest normal deceleration rate of the particular vehicle to the end that the system is enabled to differentiate automatically between concurrent skidding of all wheels, and normal rapid deceleration.

Brake application control means are provided having as its function controlling the extent to which hydraulic pressure is applied to the brake-applying means, there being one for each wheel unit, each constructed and arranged for electrical energizing and capable of relaxing the brakes to an extent dependent upon the degree of energization. These control means are electrically connected to the respective wheel circuits with each wheel circuit including means energizing its respective brake application control means to an extent dependent upon the difference between the potential of its own capacitor and that of the reference or "memory" capacitor. Thus, if any wheel rotates slower than others, its wheel circuit capacitor charges to a lower potential than the reference capacitor, whereupon electric energy is supplied to that wheel unit to cause relaxation of the brake allowing that wheel to increase its speed until the wheel speeds are substantially synchronized. As will be made evident, if the difference between the speed of the fastest rotating wheel and a slower wheel is slight, a corresponding slight relaxation of the brake of the slower wheel occurs, the relaxation effected increasing as the mentioned speed difference increases.

Fail-safe means are also provided to the end that failure of any electronic components of the system will automatically return full control of braking to the pilot's manual control and will indicate failure of the component to the pilot by a suitable signal as by lighting an indicator lamp.

In the following description, certain self evident or conventional symbolic representations may be employed in the interest of brevity, for example, C for a capacitor in association with a numeral to indicate a particular capacitor. Similarly, J followed by a numeral represents a particular junction Ry, a relay, and T a transistor. In combination, L represents left (referring to a left or port side device), while R in combination with other letters represents right, with reference to a right side or starboard device.

Detailed description of system

Figure 2:
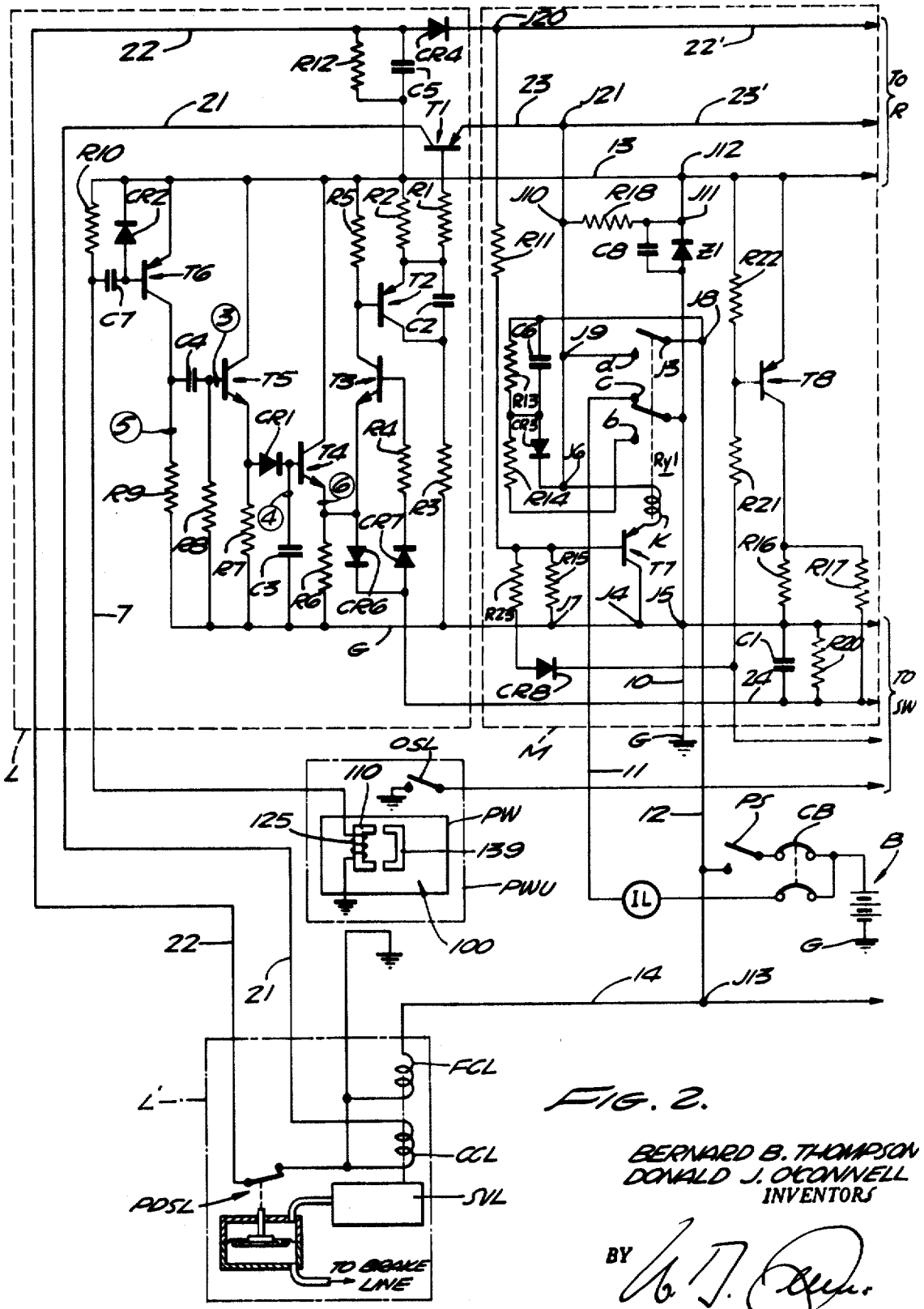
FIGURE 2 is a detailed circuit diagram of the electrical components in the control unit common to all braking wheels together with the electrical components associated with a single one of the braking wheels.

In FIGURE 2 there are shown components L, L′ and PWU operatively connected with port wheel PW, and also shown those system components common to all wheels. These common components include pilot's switch PS and indicator lamp IL, and all are energized by battery B through circuit breaker CB. Assuming that the exemplary aircraft equipped with the invention braking system is in flight, the circuit-breaker is closed preparatory to placing the brake-controlling system into operation, power being supplied by way of ground G, lead 10, rest contact c of the lower limb of a fail-safe relay Ry1, lead 11, lamp IL, breaker CB, and battery B, thus lighting the indicator lamp. Illumination of the lamp indicates electric power is available but that the automatic brake-control apparatus is not operative and that the brakes are ineffective. If, under these circumstances, the pilot controlled switch PS is closed, the system is placed in a state of readiness for landing the aircraft. Closure of switch PS permits a surge of current to flow from CB, PS, lead 12, junction J8, R13, rectifier CR3, junction J6, coil K of relay Ry1, transistor T7, and junctions J4 and J5 to ground. The energized relay Ry1 acts to close a holding circuit through junctions J8, J3, J9 and J6. Transistor T7 conducts since its base is biased negative relative to its emitter by virtue of the connection of the base to ground by way of resistor R15 and junction J7.

Closure or pull-up relay Ry1 and operation of the described holding circuit also supplies a positive potential via J9 and J10 to the emitters of a transistor T1 and a similar transistor in each of the other wheel circuits. Also a potential is supplied by way of J10, R18, J11 and J12 to a bus lead 13 extending to the electronic control units L and R (and any other main wheel units). It is also pointed out the initial closure of PS supplied current via J13 to a common lead 14 supplying current to energize each of a set of field coils CCL and FCL operatively with a control valve SVL (one for each wheel) and located in units L′ and R′, respectively, thus permitting electrical operation of brake-fluid pressure-controlling valve means subsequent to landing of the aircraft as will be explained more fully presently.

Energization of bus lead 13 energizes the field coil 125 of the speed transducer 100 in port wheel PW by way of resistor R10 and lead 7. The similar coils of the speed transducers for all other wheels are likewise energized simultaneously through similar circuits. These field coils and their associated fixed magnetic core poles 132 (FIGURE 10) are fixedly mounted relative to the axle of the respective wheel in the manner illustrated in FIGURES 8 to 10 and described in detail below. It will, therefore, be understood that so long as the aircraft is airborne and no wheel is rotating, only direct current flows through the respective field coils. However, rotation of a wheel, as wheel PW, rotates armature 139 of the associated speed transducer 100. The rotation of the armature poles 150 *in proximity to and* past the juxtaposed ring of poles 132 of the field core is effective to vary the reluctance of the flux path of the field, *and often designated a proximity coil,* coil and thereby to produce fluctuation in the field-coil current. This current fluctuation is equivalent to an alternating current superimposed upon the direct current and having a frequency directly proportional to the speed of wheel rotation. It is the frequency of this alternating component of the current which is used to determine or sense wheel speed. This may be obtained with a transducer having as few as one or as many as several thousand effective poles in the magnetic circuit.

Figure 3:
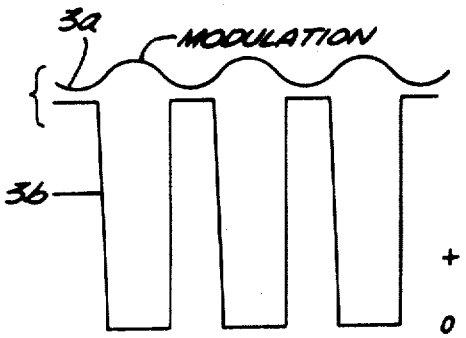
FIGURES 3, 4, 5 and 6 are typical electrical waveform diagrams illustrating changing electrical potentials at the correspondingly numbered points of FIGURE 2.
Figure 5:
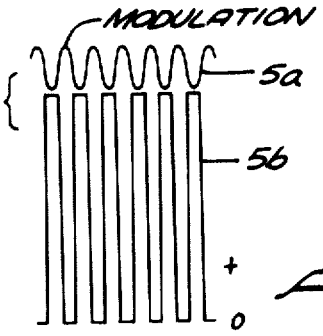

The current fluctuation flowing through field coil 125 provides an alternating potential drop across resistor R10 of the wheel-speed sensing means associated with wheel PW. This A.C. potential has a typical wave form indicated at 3a in FIGURE 3 (low wheel speed) and at 5a in FIGURE 5 (high wheel speed). The wheel speed sensing or translating means also comprises a capacitor C7, a rectifier CR2, a transistor T6, and a resistor R9, all connected as indicated. C7 couples the low potential end of R10 to the base of T6 (PNP) to render its emitter-collector circuit alternately conductive and nonconductive at a rate directly proportional to the frequency of the applied potential and also proportional to the rotational speed of wheel PW. T6 conducts only during the negative half-cycles of the applied potential. C7 has a value effective to provide low reactance to the applied alternating voltage, down to a wheel speed of, for example, 100 r.p.m. for which reason the current to the base of T6 is sufficient to saturate the transistor. Hence the current passed through T6 and R9 is intermittent and in the nature of "square wave" pulses as is indicated at 3b and 5b in the lower portions of FIGURES 3 and 5, respectively. The wave-forms of FIGURE 3 represent potentials produced at a higher speed. The presence of rectifier CR2 in the circuit in the manner shown in FIGURE 2 permits only the negative component of the alternating potential translated by C7 to be effective on the base of T6, thereby improving the quality of the square-wave potential drop produced across R9.

To convert the indication of wheel speed presented by the voltage drop across R9 into a directly usable physical measure, there are provided translating circuit means comprising a capacitor C4, resistors R8 and R7, and a transistor T5, all connected as indicated in FIGURE 2. Circuit elements C4 and R8 serve to differentiate the square wave potential appearing across R9, in FIGURE 4 and 6a wave potential appearing across R9, typical differentiated waves being those indicated at 4a in FIGURE 4 and 6a in FIGURE 6. The sharply peaked potential represented by wave 4a (or by 6a at higher speeds) is applied directly to the base of NPN transistor T5, where the positive-going half of the wave induces conduction through the collector-emitter circuit of the transistor. During the intervening and negative-going periods of the waves 4a and 6a, T5 is not conductive due to the absence of a positive bias.

The pulses of curent passed by transistor T5 are divided, part of these coursing through resistor R7 creating a potential drop which induces a portion of the current to pass through a rectifier CR1 and to charge a capacitor C3. The charge thus placed on C3 is permitted to leak away during the non-conducting intervals of T5, the leakage being by way of the base of a transistor T4 connected in the wheel circuit of wheel PW, as shown. Thus the potential, and the charge, of C3 vary as is indicated by wave-form 4b of FIGURE 4 (at a lower wheel speed) and as indicated by wave-form 6b of FIGURE 6 (at higher wheel speed). As is indicated by those wave-forms, the potential and charge of C3 is proportional to the frequency of the charging pulses, the leakage between pulses being less at the higher frequencies. Thus the charge on C3 (and the potential at C3), averaged over each pulse cycle and corrected at each cycle, is a physical measure directly indicative of wheel speed during the immediately previous time interval. Transistor T5 serves as an amplifier, and it will be understood that capacitor C3 accumulates a potential at each charging proportional to the instantaneous and contemporaneous rotational speed of wheel PW. Further, since the charge on C3 is permitted to leak away during each of successive brief intervals of time between recharging, the average potential over a few cycles is proportional to the average wheel speed during that time.

The potential of the charge on C3 is applied to the base of NPN transistor T4 having its collector terminal connected to positive bus lead 13 and having its emitter terminal connected to ground through resistor R6. Thus current flow through T4 is regulated by and is proportional to the potential of C3.

Elements T4 and R6 act similarly to a cathode follower circuit for which reason it will be recognized that the voltage drop across R6 is proportional to the potential of C3 and also proportional to the rotational speed of wheel PW. This voltage is applied by way of a diode CR6 to the "high" potential terminal of the previously mentioned "memory" or reference capacitor C1, the other terminal of C1 being connected to ground. Memory capacitor C1 has a large capacitance relative to that of C3; and it is connected in identical manner in each of the other main wheel circuits each having a capacitor corresponding to C3. Thus C1 is connected to be charged to a potential directly proportional to (substantially equal to) the potential of C3 if wheel PW is at the moment the fastest rotating wheel, or to the potential of the particular one of the other wheel circuit capacitors associated with the then fastest running wheel.

From the preceding description it becomes evident that during operation of the craft with the wheels rotating, memory capacitor C1 is intermittently recharged at each of successive brief intervals to a potential characteristic of the immediately previous but substantially contemporaneous speed of the fastest rotating one of the load bearing wheels of the craft. It follows that the potential of the charge on C3 serves as a reference standard usable to govern braking effort of the other wheels. The fastest rotating one of the wheels is the one having the least slippage with respect to the ground surface, and hence is the wheel whose braking should be increased relative to the other wheels. This is accomplished by relaxing braking of the other wheel or wheels to permit all wheels to attain substantially the same speed. If an increase in total braking effort is required brake application at all wheels is increased by increased brake pedal pressure (or the equivalent) by the pilot.

The several wheel circuit capacitors, such as C3 in the circuit of wheel PW, discharge relatively rapidly, as is indicated by wave forms 4b and 6b, but the circuit of memory capacitor C1 discharges at a much slower rate. The time constant of the latter circuit is so chosen that the difference between the potential of C1 and C3, for example, is a measure of wheel deceleration and will be explained more fully presently. The mentioned potential difference of reference capacitor C1 and wheel-circuit capacitor C3 is applied to the base emitter circuit of transistor T3 located in the respective wheel circuit means. As is indicated in FIGURE 2, the base of T3 is connected via resistor R4 and diode CR7 to the high potential side of C1; and the collector of T3 is connected via R5 to the positive bus 13.

As the preceding description explains if one of the wheels decelerates more rapidly than another, for whatever reason, the charge on the respective wheel circuit capacitor drops as does the voltage across the corresponding R6 resistor. As this occurs, and assuming that the exemplary wheel PW is the more rapidly decelerating wheel, reference capacitor C1 commences to discharge through diode CR7, resistor R4, and transistor T3, thereby biasing T3 to the conductive state and permitting current to flow from positive bus 13 through R5, T3 and R6 to ground. The resulting voltage drop across R5 biases PNP transistor T2 to the conductive state, with the result that current courses from positive bus 13 through R2, the emitter-collector circuit T2 and R3, thence to ground. As a consequence of current flow through R2, the potential applied to the base of PNP power transistor T1, by way of a resistor R1, decreases and, going negative relative to the emitter voltage, causes T1 to conduct current through its emitter-collector circuit. That current, courses from junction J10 to J21, through T1, lead 21, control coil CCL of a hydraulic servo-valve SVL associated with wheel PW, pressure-differential switch PDSL, return lead 22, diode CR4, and resistors R11 and R15 to ground. In response to increasing current flow through coil CCL by way of T1, servo-valve SVL acts to decrease the fluid pressure applied to the brake of wheel PW and thereby the applied braking effort.

While not necessary in all cases a capacitor C2 may be shunted across transistor T2, in the manner shown in FIGURE 2, to retard decay of the signal applied to the transistor. The values of the several described components are chosen in accord with known electronic design principles to provide a signal magnitude to the servo-valve control coil CCL of wheel CW proportional to the rate of deceleration of the wheel, and similiarly with respect to the other wheels and respective valve means. The proportionality is not linear and preferably the constants are so selected that reduction or relaxation of fluid pressure applied to a brake cylinder commences at about 5% wheel-slip and continues to the fully off condition at about 25% wheel-slip. In this connection, wheel-slip is defined as the ratio of effective tread speed with respect to ground speed of the vehicle.

It will be understood, as hereinbefore indicated, that there is a respective wheel circuit for and associated with each of the principal independent load bearing wheels of the vehicle. Thus the following features may be noted: (1) the valve control-coil return leads 22, 22′, etc., from the several similar wheel units all join at a common junction J20; (2) positive potential is supplied to the emitters of the respective power transistors, such as T1, from J10 by way of a common junction J21 and leads such as 23, 23′; (3) the speed-sensing and translating portions of the several wheel circuits are supplied with positive potential from common bus lead 13; and (4) reference or memory capacitor C1 is supplied potential by way of a lead 24 common to all wheel circuits. Rectifiers, such as CR6 and CR7 in the wheel circuit associated with wheel PW, are interposed between the high-potential terminal of C1 and the speed-sensing and translating portions of the wheel circuits to prevent interaction between the individual wheel circuits.

Figure 4:
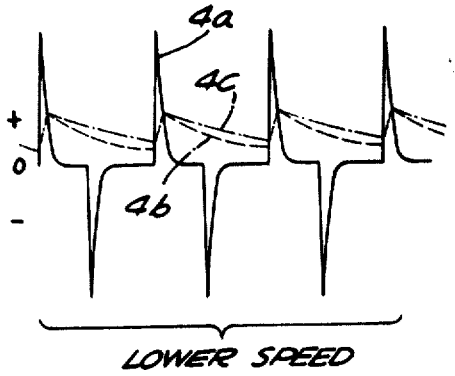
Figure 6:
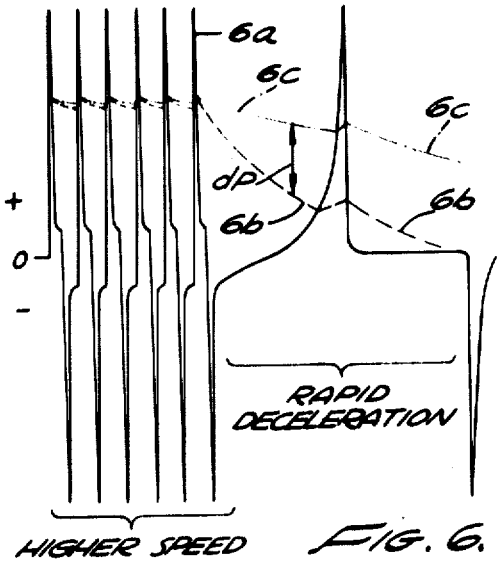

As is indicated in FIGURE 4, which depicts exemplary wave-forms representative of potentials obtaining at a relatively low speed, and in FIGURE 6, which depicts comparable wave-forms of potentials during high-speed rotation of a wheel and during very rapid deceleration of the wheel, the potential (wave-form 4b) applied to T4 at low wheel speed is considerably lower than that (wave-form 6b) applied during rapid wheel rotation. The wheel circuit capacitor potential, represented by wave-forms 4b and 6b, is the potential used for comparison with the potential of reference capacitor C1. The potential of the latter is represented by wave-form 4c (at low wheel speed) and by wave-form 6c at fast wheel speed and during very rapid deceleration. It may be noted from FIGURE 4 that 4c decays more slowly than does 4b. The difference between these two potentials is applied to the base of T3. It will, therefore, be apparent that, at low differences of wheel speeds, transistor T3 is substantially cut-off. However, as is apparent from FIGURE 6, when one wheel is rotating faster than another, the potential (waveform 6c) of the reference capacitor is high relative to that wave-form 6b of a wheel circuit capacitor such as C3, and a large difference of potential is applied to the base of T3 to initiate a heavy current flow through T1 and the valve control coil. The potential difference is denoted dP in each of FIGURES 4 and 6.

In order that the braking system may revert automatically to direct manual control of braking in event of malfunction or failure of a component, and so that the operator or pilot may be apprised of such event, the invent system includes a "fail-safe" means. When such malfunction or failure occurs, the "inoperative" signal lamp IL illuminates, indicating to the operator that braking is on a manual operation basis. The pressure-differential switch PDSL (FIGURE 2) associated with wheel PW, and respective similar switches each associated with a respective one of the other wheels, is in each case sensitive on one side to the pressure of the metered brake fluid operating the brake-applying piston of a brake, and on the other side to the controlled brake fluid pressure downstream of the servo-valve SVL. That is, the pressure-differential sensitive actuator of the switch is effective to compare the two pressures just referred to. If the controlled fluid pressure falls below a predetermined value with respect to metered fluid pressure, the switch opens and initiates action leading to deactivation of the automatic control means and to energization of indicator lamp IL. When switch PDSL (or its counterpart at another wheel unit) opens, the connection of lead 22 to ground is severed and capacitor C5, which has been continuously charged due to the voltage drop across a resistor R12, discharges through R12. As indicated, C5 and R12 are connected in shunt relationship, between positive bus lead 13 and lead 22.

If the malfunction or failure does not correct very quickly, continuing discharge of C5 permits the increasing potential at its negative terminal to exceed the potential at the emitter of transistor T7. When the latter occurs, the potential at the negative terminal of C5, as reflected through diode CR4, junction J20, and resistor R11 all connected as indicated, biases 17 out of conduction. As soon as T7 ceases to conduct, relay Ry1 falls out, de-energizing all wheel circuits, and current courses to ground from battery B by way of CB (lower limb), lamp IL, lead 11, relay contact c, and junction J5. Thus the energized indicator lamp apprises the pilot of the inoperative status of the system.

The time delay between occurrence of the malfunction and deactivation of the automatic control of the brakes by the system is determined by the time constant of the circuit loop comprising capacitor C5 and resistor R12, the respective values of these components being selected to provide the desired delay interval. When relay Ry1 drops out due to component malfunction or failure, it will not pull in again until switch PS is opened and capacitor C6 is allowed to discharge through resistor R13. While switch PS remains closed, C6 continues to be charged since that capacitor is connected to ground by way of coil K of relay Ry1. However, the very small current necessary to maintain the charge is insufficient to pull up the relay.

It is desired to prevent application of the brakes of the aircraft prior to landing, thereby avoiding possibility of the craft touching down with locked wheels. An additional circuit to safeguard against this is a feature of the system. A set of switches, each associated with a respective one of the principal wheel supports, and each sensitive to the associated wheel support bearing a load, are connected in series. These switches, OSL and OSR in the exemplary vehicle schematically shown in FIGURE 2 are sensitive to the fluid pressure in the respective shock absorbers, and are each constructed to be closed until forced open by increased hydraulic fluid pressure occurring when the associated wheel unit touches down on the runway. As is indicated, the two exemplary switches are connected that when both are closed, the base of transistor T8 located in common circuitry M is connected to ground through resistor R21. The base of the transistor is also connected by way of a resistor R22 to positive bus 13. Thus with the two switches closed, transistor T8 is rendered conductive by the negative base-emitter bias provided by the potential drop across R22. In addition, the closed switches connect to ground the base of the transistor T7, by way of a resistor R23 and a rectifier CR8.

Thus as long as switches OSL and OSR are closed, a negative base-emitter bias is applied to T7, keeping that transistor conductive and preventing the fail-safe circuit from operating while the craft is airborne.

The collector of transistor T8 is connected to ground by way of a resistor R16 and junction J5, as indicated; and resistor R16 and a resistor R17 of lower value are connected across memory capacitor C1, as shown. With the switches OSL and OSR closed (flight condition), transistor T8 is conductive as previously noted, and thus provides current for charging memory capacitor C1 through R17. The values of R16, R17 and a resistor R20 connected in shunt across C1, are so chosen that the charge thus accumulated by C1 (with no charge on any wheel circuit capacitor C3) provides an effect equivalent to that obtained with the craft on the ground and moving at low speed, as for example, 15 miles per hour. As a consequence of the lack of a charge on C3 (because the associated wheel is not rotating while the craft is in flight), and the concurrent charge on reference capacitor C1 of the maximum valve signal is applied to the several control coils such as CCL, causing substantially complete relaxation of the brakes while the craft is in flight. Thus with switch PS closed it is impossible for the pilot to apply the brakes until sufficient craft weight is assumed by the wheels to open one or both of switches OSL and OSR. As the wheels touch ground and quickly reach landing speed, the charges on the wheel circuit capacitors, such as C3, immediately appear and provide a much higher charge on C1 than that supplied through T8 and R17. Thus prior to opening of switches OSL and OSR and as the weight of the craft becomes wheel-borne, control of braking is shifted to the automatic means described. The fact that the shock-controlled switches such as OSL and OSR remain open so long as the craft is wheel-supported, permits the brakes to be applied, as in parking, after the wheels are no longer rotating and a charge no longer exists on capacitor C3.

Figure 7:
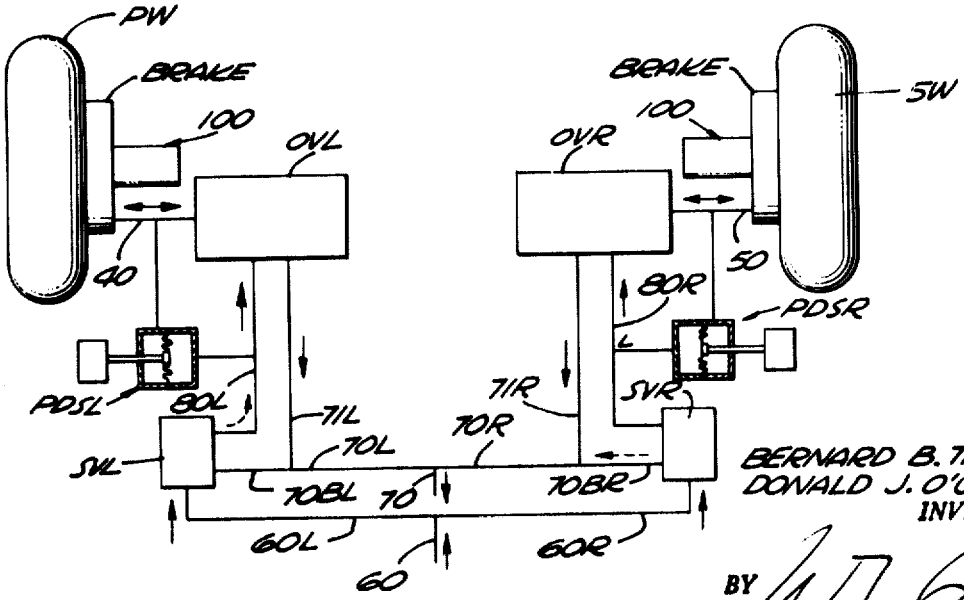
FIGURE 7 is a schematic showing of the hydraulic fluid components of the braking system.

A suitable exemplary hydraulic system is diagrammatically depicated in FIGURE 7. Therein the two exemplary wheels PW and SW will be understood as supplied with brake-applying fluid pressure via respective hydraulic conduits 40 and 50. Increasing pressure in those conduits causes increasing application of the respective brakes of the corresponding wheel. As is indicated, each of conduits 40 and 50 has a branch transmitting the respective pressure to one side of the diaphragm of the corresponding pressure-differential switch, PDSL and PDSR. Hydraulic fluild under a suitable pressure is supplied from a source (not shown) by way of a supply conduit 60, the fluid coursing therefrom through either or both branch supply conduits 60L and 60R to respective servo-valve means SVL and SVR. Fluid is pumped through the hydraulic system continuously, and returns to the source of supply via a return conduit 70 which is fed by branch return conduits 70L and 70R.

Fluid may be bled into the respective branch return conduits from respective servo-valves SVL and SVR by way of bleed conduits 70BL and 70BR; and/or from control valves CVL and CVR by way of main return conduits 71L and 71R, respectively, depending upon operating conditions. Under a first condition in which the automatic control system is inoperative, the servo-valves direct fluid under pressure from 60L and 60R directly into respective conduits 80L and 80R for conveyance directly to respective operator-controlled valves OVL and OVR, where the fluid is bypassed into respective ones of the return conduits 71L, 71R in an amount inversely proportional to brake pedal pressure or other operator-controlled effect. Thus, under this condition if the operator does not apply pedal pressure or other operator-controlled effect, all fluid is bypassed into the return conduits and the brakes are not applied. Also, if the operator applies pedal pressure to an increasing extent, the pressure of fluid supplied will be increasingly applied to the brake-applying pistons or other means, as is well known to those skilled in the brake art.

Under a second condition, in which the automatic system of the invention is operative, the respective servo-valves SVL and SVR operate to bypass fluid into respective conduits 70BL and/or 70BR in an amount dependent upon the extent of energization of the servo-valve control coils such as coil CCL of FIGURE 2. Thus it is evident that relaxation of brake application can be effected by the system irrespective of operator action, incident to rotation of a wheel at a rate substantially slower than that of another wheel.

While any suitable form of servo-valve SVL functioning as hereinbefore prescribed may be employed, a preferred form is that illustrated and described in co-pending application of Jack S. Anderson, Daniel R. Smith and Maurice A. Gage, Serial No. 221,650 filed August 15, 1962.

Figure 9:
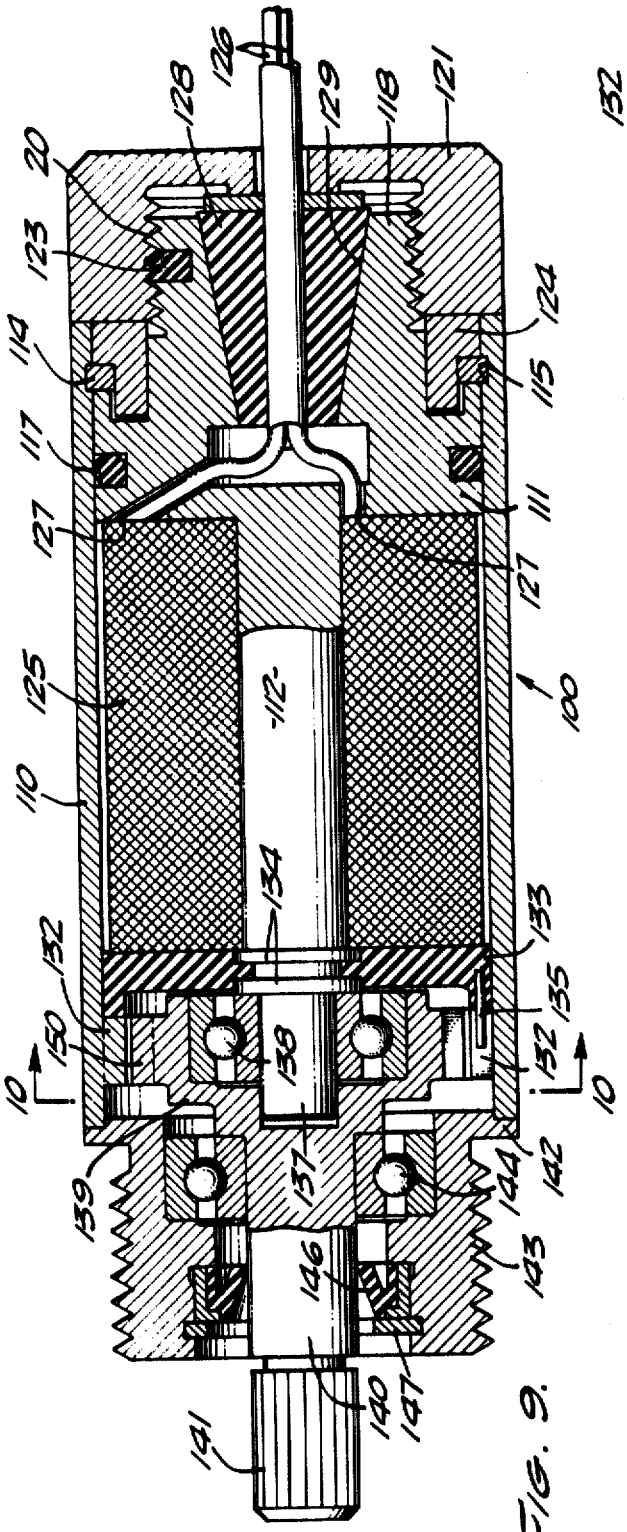
FIGURE 9 is a longitudinal sectional view on an enlarged scale through the speed transducer coupled to each wheel to be braked.
Figure 10:
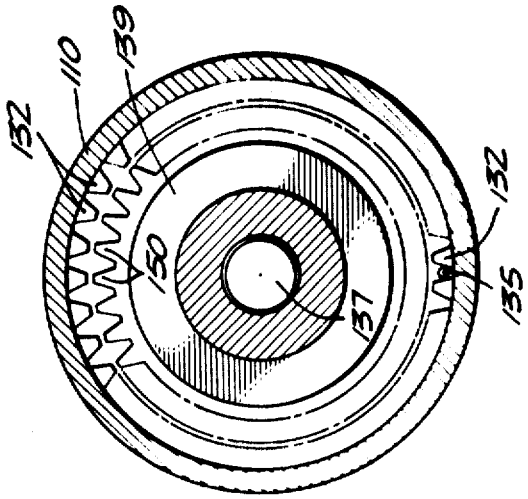
FIGURE 10 is a transverse view taken along line 10—10 on FIGURE 9.
Figure 8:
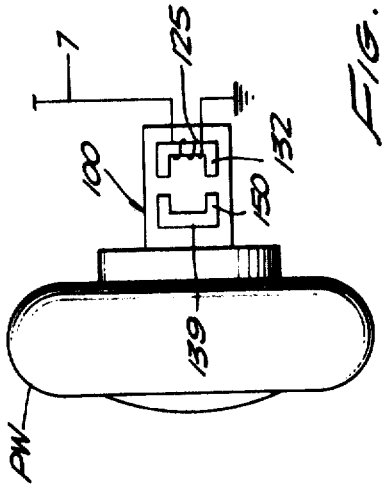
FIGURE 8 is a schematic view of the speed transducer and its operative relationship to a wheel to be braked.

Referring more particularly to FIGURES 8 to 10, there are shown details of an improved novel speed transducer designated generally 100. This transducer has a generally cylindrical outer housing 110 formed of nonmagnetized ferro-magnetic material, the right hand end of the housing being sealed closed by an end cap 111 provided with an integral stem or core member 112 and formed of the same material as housing 110. End cap member 111 is held in assembled position within housing 110 by a split ring keeper 114 seating within groove 115 formed inwardly of the end of the housing. An O-ring seal 117 is seated within a receiving groove of the end cap and safeguards against the possibility of fluid leakage between the end cap and the housing.

End cap 111 is provided with a threaded extension 118 to which is secured a threaded cap 121. Desirably extension 118 is provided with a plastic insert or retainer 123 the outer end of which is cut into by the threads of cap 121 as it is rotated into its assembled positions, the plastic being effective to prevent loosening of the cap. A locking collar 124 having the configuration shown in FIGURE 9 is inserted prior to the assembly of end cap 121, it being noted that the skirt of this collar fits snugly within locking ring 114 to safeguard against the possibility of the lock ring becoming disengaged from groove 115.

Compactly wound onto core member 112 is a field coil 125 having its opposite ends or leads 126 extending outwardly axially of cap 121 through passages 127. A positive seal between these leads and the end cap is provided by a frusto-conical resilient plug 128 fitting snugly about the covering for the lead wires and having its exterior nested within the frusto-conical well 129 formed centrally of the end cap. A bearing washer is interposed between the outer end of plug 128 and the interior of end cap 121, it being understood that these parts are so dimensioned that tightening of the end cap until it bottoms against the end of housing 110 places plug 128 under high compressive forces effective to assure a fluid-tight seal between well 129 and the terminal wires.

The opposite or left hand end of housing 110 has an interior closure ring 133 of suitable high strength impervious insulating material, the inner or central portion of which has a radial flange molded between axially spaced flanges 134 surrounding core member 112. The outer periphery of ring 133 has an axial extension having a snug fit with the interior of housing 110 and seating against a ring of closely spaced tooth-like pole pieces 132 best illustrated in FIGURE 10. Poles 132 are integral with cylindrical housing 110 and are arranged in a uniformly spaced annular ring projecting inwardly from the interior side walls of this housing. A pin 135 embedded within ring 133 extends between a pair of adjacent teeth 132 and prevents rotation of ring 133.

The portion of the central core 112 outwardly of flanges 134 forms a stationary shaft or hub 137 supporting antifriction bearing assembly 138 for a rotary armature 139 of suitable ferro-magnetic material. Integral with armature 139 is a driving shaft 140 the outer end of which is provided with splines 141 adapted to mate with complementary splines carried by the rotating axle of the aircraft or other wheel to which it is to be attached. The means for detachably mounting speed transducer 100 to the stationary structure of the wheel assembly comprises a hub 142 suitably secured to the end of housing 110 as by brazing and having a threaded shank 143 adapted to mate with threads carried by the wheel supporting assembly. Antifriction bearing assembly 144 is inserted between hub 142 and armature shaft 140. This bearing may be packed with grease which is sealed against escape by a suitable shaft seal assembly 146 locked in assembled position as by a split ring keeper 147.

Remaining to be pointed out and of importance is the presence on the peripheral rim of the armature of tooth-like members 150 corresponding in number to stationary teeth 132 carried by housing 110. The juxtaposed tips of these two sets of rotating and stationary teeth are spaced very close together as is indicated by FIGURE 10.

The operation of the described speed transducer 100 will be quite apparent from the foregoing detailed decription of a preferred construction. It will of course be understood that the transducer is anchored to a stationary part of the wheel assembly, the speed of rotation of the wheel of which is to be measured, the splined end 141 of the transducer shaft 140 being coupled to rotate with the wheel. Coil 125 is energized from a constant potential direct current power source such as battery B (FIGURE 2). This maintains a high density steady flux field substantially confined to the flux circuit provided by housing 110, end cap 111, core 112, armature 139 and the juxtaposed sets of teeth 132 and 150 carried respectively by housing 110 and armature 139. So long as the wheel is not rotating and coil 125 is energized, the flux field in the described flux circuit will be constant. However, should the wheel connected to armature 139 rotate, teeth 150 will be rotated relative to teeth 132 thereby alternately increasing and decreasing the air gap between the adjacent ends of these two sets of teeth. This fluctuating air gap alters the reluctance of the flux path and generates an alternating current to modulate the direct current flowing through coil 125 and the circuit to which it is attached, the modulated alternating current signal having a frequency proportional to the speed of rotation of the wheel and attached armature 139. This alternating current signal is the one which is sensed by the major sets of components L, L′ and R, R′ described above and functioning to control operation of the wheel brakes in the manner described in detail hereinabove. Although transducer 100 has been described herein in combination with a vehicle brake control system it is to be understood that the speed transducer per se has numerous applications in other operating environments. It is also to be understood that the number of teeth can be varied widely and as desired, any number between one and a very large number being effective to generate an A.C. component and to superimpose this component on the D.C. current flowing in the energizing coil circuit.

While the particular automatic brake control system herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

We claim:

1. A brake-control system for a vehicle having at least first and second principal load-supporting wheels each having associated brake means, said system comprising: first means including at each of the said first and second wheels respective conductor means furnishing electric energy and a respective electric energy modulating means effective to frequency-modulate the supplied electric energy at frequencies proportional to instantaneous rotational wheel speeds and also including respective electric brake-application control means for controlling the corresponding brake means, second means including in electrical association with each of said first means a respective electric means including a circuit means responsive to modulation of said supplied electric energy to provide and store a respective electric charge of potential proportional of the frequency of modulation of the respective electric energy, third means including electric circuit means common to all said electric means and including a reference charge-storing means connected to each of said several electric means and effective to be charged to a reference potential equal to the highest instantaneous potential among the stored charges of said several circuit means, and fourth means comprising control means including means for dissipating the charge of said reference charge-storing means at a predetermined rate and including also means responsive to a difference of potential between said reference potential and that of an electric charge stored in one of said circuit means and effective to apply electric energy to the corresponding brake-application control means of the corresponding wheel to decrease the braking effort thereof, thereby to equalize the rotational speed of said wheels.

2. A brake-control system for a vehicle having first and second independent load-supporting wheel units each comprising a wheel and respective brake means and associated brake-application and control means, said system comprising: first means including first and second electric supply means supplying electric energy to respective ones of said wheel units and including respective first and second energy modulating means effective in response to wheel rotation to frequnecy modulate the electric energy supplied thereto and thus produce respective first and second modulation effects each proportional to the rotational speeds of the respective wheel, second means connected to said first means and comprising first and second translation-circuit means each associated with a respective one of said modulating means and each effective in response to frequency-modulated electric energy supplied thereto from the associated modulating means to produce and store a respective one of first and second variable electric quantities the respective first and second potentials of which during any brief time interval are proportional to the rotational speeds of the respective associated wheels at that time and each said circuit means comprising means for dissipating the respective stored electric quantity at a first rate, third means connected to said first and second means and including power supplying means and means responsive at any time to the stored first and second variable electric quantities to provide a comparison potential mathematically related to the higher of said first and second potentials and also effective in response to comparison of the comparison potentials with the lower of said first and second potentials to supply control energy to that wheel unit associated with the lower of said potentials in amounts proportional to the difference between said first and second electric quantities, and fourth means connected to said third means and including in each said control means a respective means effective when energized to relieve brake-application in proportion to the magnitude of energization thereof, threby to relieve brake application at the slower of said wheels.

3. A system as defined in claim 2 characterized in that said modulating means in each wheel unit comprises a repsective rotatable plural-pole armature constructed and arranged to rotate with a wheel, and respective relatively fixed field coil associated with each armature the flux path of which is varied incident to relative rotation of the associated armature.

4. A system as defined in claim 2 characterized in that each of said translation-circuit means includes therein biased transistor circuits means effective in response to the respective frequency-modulated electric energy to conduct unidirectional current pulses at a rate proportional to the modulation-frequency of the electric energy, and also means for translating the unidirectional current pulses to a respective one of said first and second variable electric quantities.

5. A system as defined in claim 2, said third means including as the means to provide a comparison potential a reference-potential capacitor, and also including means for causing continuing discharge of said capacitor to dissipate the energy stored therein at a rate less than said first rate, whereby said capacitor serves as a variable memory element retaining an indication of fastest-wheel rotational speed in event of excessive deceleration of that wheel and effective to initiate relaxation of braking at that wheel in that event.

6. A system as defined in claim 3, each said translation-circuit means comprising biased transistor circuit means effective in response to the respective frequency-modulated electric energy to conduct unidirectional current pulses at a rate proportional to the modulation-frequency of the electric energy and comprising also means for translating the unidirectional current pulses to a respective one of said first and second variable electric quantities.

7. A system as defined in claim 3, each said translation-circuit means comprising a biased transistor circuit means effective in response to the respective frequency-modulated electric energy to conduct unidirectional current pulses at a rate proportional to the modulation-frequency of the electric energy and comprising also means for translating the unidirectional current pulses to a respective one of said first and second variable electric quantities, and said third means including as the means to provide a comparison potential a reference potential capacitor, and also including means for causing continuing discharge of said capacitor to dissipate the energy stored therein at a rate appreciable less than said first rate, whereby said capacitor serves as a variable memory element retaining an indication of fastest-wheel rotational speed in event of excessive deceleration of that wheel and is thereby effective to initiate relaxation of braking at that wheel in that event.

8. In a brake-control system for a vehicle having at least first and second independent load-supporting wheel units each comprising a respective wheel having an associated brake and a brake-applying means and a brake-application-control means effective upon energization thereof to relax brake-application in an amount proportional to the magnitude of energization, the combination comprising: first and second wheel-speed-sensing and indicating means, each for and associated with a respective load-suporting wheel and variably effective to indicate at any time a representation of the rotational speed of the respective wheel and concurrently effective to charge a respective capacitive speed-indicating circuit to a potential indicative of the contemporaneous rotational speed of the associated wheel; comparison and control-circuit means and responsive at the commencement of each of means and responsive at the commencement of each of successive short time intervals to the highest speed-indicating potential among the said capacitive speed-indicating circuits to provide and store a reference potential representative of the immediately previous rotational speed of the fastest-rotating one of said wheels; and means for utilizing the difference between the contemporaneous existing reference potential and a reference potential corresponding to that indicative of the slower one of said wheels to energize said brake-application-control means to relax brake application of the slower one of said wheels to an extent proportional to said difference, whereby to more nearly equalize the rotational speeds of said wheels.

9. In a brake-control system as defined by claim 8 characterized in the provision of means for dissipating the stored reference potential at a predeterminable rate commensurate with the decrease of the highest speed-indicating potential during a normal maximum-deceleration operation of the vehicle, whereby in the event of locked skidding of all wheels the braking relaxation will be controlled in accordance with the slowing dissipating reference potential.

10. A brake-control system as defined by claim 9 characterized in the provision of means for disabling said wheel-speed-sensing and indicating means incident to failure of any component in either thereof, thereby to disable the automatic brake-application control means and permit manual control of braking of the vehicle.

11. A brake-control system for controlling brake-application to wheels of a vehicle having first and second independent load-bearing wheels each having brake means and brake-applying means, said system comprising in association with each wheel a respective first means providing fluctuating electric energy having a fluctuation frequency proportional to the rotational speed of the respective wheel, each wheel having associated therewith a respective second means connected to the respective first means and effective to translate the fluctuations of the respective electric energy to provide a unidirectional pulsating electric current of the same frequency, each wheel also having associated therewith a respective third means including transistor means biased alternately to and from conductive state by the corresponding pulsating electric current and including electric energy-storing means arranged to provide a wheel-speed indicating potential proportional to the respective frequency and wheel-speed, each wheel also having a fourth means comprising an indicator-storing means arranged to store an indication of the corresponding wheel-speed indicating potential, common means connected to be furnished and to store a potential reference indication of the highest wheel-speed indicating potential, each wheel also having a respective control means effective when energized to relax brake-application at that wheel to an extent proportional to the energization; each wheel further including a respective means including second transistor means connected to be biased to conduct current to an extent proportional to any difference between the said reference indication and the indication stored by the respective fourth means, and each wheel further having associated therewith respective means connected to utilize the current conducted by the associated second transistor means to energize the corresponding control means, whereby when any of the wheels rotates more slowly than another the brake-application of the slower wheel is relaxed to permit that wheel to increase speed.

12. A wheel brake control system for a vehicle having first and second independent load-bearing wheel units with respective brake means operating to permit continuous substantially maximum braking effort at each wheel while preventing locked-wheel skidding, said system comprising: first means including for each wheel respective means supplying electric energy at a frequency directly proportional to the rotational speed of the wheel and also including an electrically-operable brake-application control means operable when energized to relieve application of braking effort at the wheel, second means including for each wheel unit an associated charge-storing means and means for translating the frequency of the respective supplied energy to a stored electric charge having a potential proportional to the frequency of the supplied energy, third means including reference charge-storage means connected to the charges stored in the said second means and charged to the highest potential of the stored charges and also including means for dissipating the charges of the charge-storing means at a first rate and that of the reference charge-storage means at a slower rate, and fourth means including means responsive to a difference of potential between the reference charge-storage means and that of a charge-storing means associated with a wheel to energize the brake-application control means thereof and thereby reduce application of braking effort at that wheel.

13. A brake control system for a vehicle having at least first and second independent load-bearing wheel units each having a wheel and a respective brake means and brake-applying means, said system comprising in combination with the named means, first means including for each of said wheel units a respective rotational speed sensing and indicating unit effective in response to wheel rotation to produce and store a speed-representing electric charge having a potential proportional to the instantaneous rotational speed of the wheel, second means including means connected to all said units and continuously effective to produce and store a varying reference charge whose potential at any time bears a substantially constant relationship to the highest prevailing potential of the speed-representing charges and also effective in response to decrease of potential of one of said speed-representing electric charges to a value increasing the ratio of said relationship to provide the corresponding wheel unit electric energy in proportion to the variance from said constant relationship, and third means connected to said second means and including for and at each wheel unit a respective electrically energizable means effective in response to energization by said second means to reduce brake application by the associated brake-applying means in proportion to the energization provided by said second means, thereby permitting the associated wheel to increase rotational speed to that of the fastest rotating one of the said wheels.

14. In a brake control system for a vehicle having at least first and second independent load-supporting wheel units each comprising a respective wheel provided with an associated brake and a brake-applying means and a brake-application control means effective upon energization thereof to relax brake application in an amount proportional to the magnitude of energization, the combination with each of said wheels of a respective electric energy supplying means effective to supply energy at a frequency directly proportional to the rotational speed of the respective wheel, means including first and second frequency-discriminator means each connected and arranged to be responsive to a respective electric energy supplied and effective in response thereto to provide a respective one of first and second electric potentials of effective value proportional to the frequency of the respective supplied energy, a reference means connected and arranged to produce and store a reference electrical effect proportional at any time to the potential of greatest effective value among the said electric potentials and to produce a control effect proportional to the difference at that time between the said reference electrical effect and the corresponding effect producible by the least effective of said first and second potentials, and means effective at said time to utilize the produced control effect to energize the brake-application control means of the slower of the said wheels to relax brake application in measure proportional to said difference.

15. A braking-control system for a vehicle having at least first and second principal load-supporting wheels each having brake means, brake-applying means including brake-application control means effective when energized to relax brake-application at the respective wheel to an extent proportional to the energization thereof, said system comprising: first means including in association with each wheel a respective circuit means effective to provide respective continual physical representations of the rotational speeds of the respective wheels and a similar reference physical representation representative of the immediately previous rotational speed of the fastest rotating one of the wheels; and second means including transistor circuit means connected to said first means and to the brake-application control means effective to compare with the reference physical representation each of the respective continual physical representations associated with the individual wheels, and in response to a difference between the reference physical representation and that representative of the rotational speed of any particular wheel effective to energize the brake-application control means associated with that particular wheel to an extent proportional to the said difference, whereby during braking of the vehicle the fastest-rotating wheel serves as a reference standard for control of relaxation of brake-application to a slower-rotating wheel whereby to permit the slower wheel to increase rotational speed relative to the faster-rotating wheel, said first means includes a wheel-speed transducer having a coil and a stator structure operatively associated therewith provided with pole means, a rotary armature structure having pole means disposed for rotation in closely spaced relation to said stator pole means, means connecting said armature to a wheel of said vehicle for rotation thereby, and means for energizing said coil with direct current to maintain a flux field in said stator and armature structures whereby the relative rotation of said stator and armature structures varies the reluctance of the flux circuit and generates an alternating current signal in said coil the frequency of which is directly related to the speed of wheel rotation.

16. Means in a brake control system according to claim 14, in which said means to produce a control effect proportional to the difference between the said reference electrical effect and the corresponding effect by the least effective of said first and second potentials comprises a transistor having base emitter and collector electrodes and to respective ones of which emitter and base electrodes said reference electrical effect and said corresponding effect are applied, whereby said transistor is rendered conductive to an extent dependent upon the difference in values of said effects, and in which said means effective to utilize the control effect comprises a valve-regulating coil connected to conduct current flowing through said emitter and collector electrodes.

17. Means in a brake control system according to claim 14, in which each of said first and second frequency discriminator means comprises means connected to the respective one of said electric energy supply means and effective to produce from a component thereof varying at the frequency of said energy a potential of value proportional to the frequency of said energy, and in which the thus produced potential of highest value among the potentials thus produced is in a capacitive means therefor provided stored as a reference potential constituting said reference effect.

18. Means in a brake control system according to claim 17, in which said reference means comprises a common capacitive device connected to be charged by the said potential of greatest effective value among said electric potentials, and further comprises a transistor having control, emitter and collector terminals and connections for applying said potential of greatest effective value to one of said terminals and said least effective potential to another of said terminals whereby to bias said transistor to a selected one of conductive and nonconductive states in response to said reference potential exceeding the other of said potentials, and in which said control effect is produced as a result of said transistor being biased to the said selected one of said conductive and nonconductive states.

19. Means according to claim 14, in which each of said energy-supplying means is effective to supply energy modulated at a frequency directly proportional to the said rotational speed of the respective wheel.

*20. In anti-skid system for a rotatable wheel the combination of*

*a proximity coil means positioned adjacent said wheel, means to electrically energize said proximity coil means to produce a magnetic field therearound,*

*actuator means operatively carried by said wheel and adapted to pass through the magnetic field of said proximity coil means to produce electrical pulses in proportion to the rotational speed of said wheel,*

*circuit means adapted to produce an electrical output signal inversely proportional to the frequency of said electrical pulses, and*

*control means responsive to the electrical output signal of said current means to provide anti-sktd control for said wheel.*

*21. In an anti-skid system for a wheel of a vehicle having at least first and second independently-rotatable wheels the combination of:*

*first means, including electrical operating means disposed in a magnetic field;*

*second means, including operable means associated with said first of said wheels and said electrical operating means, effective to produce electrical fluctuations the frequency of which is proportional to the rotational speed of said first one of said wheels,*

*third means, associated with said first means and said second means, effective to produce in response to said electrical fluctuations an electrical output signal bearing a known relationship to the frequency of said electrical fluctuations; and*

*fourth means, connected to said third means and including control means utilizing said output signal to provide graduated anti-skid control for said first wheel incident to a change in a characteristic of said electrical fluctuations.*

*22. The combination as defined in claim 21, in which said electrical operating means includes proximity coil means effective to produce said electrical fluctuations as said first of said wheels rotates and disturbs said magnetic field and in which said control means is effective to provide anti-skid control for said first wheel in proportion to the magnitude of said output signal.*

*23. The combination as defined in claim 21, in which said third means is effective to produce an electrical output signal proportional to the time rate of decrease of frequency of said electrical fluctuations.*

*24. The combination as defined in claim 21, characterized in that said third means includes means for producing a reference signal representative of the rotational speed of the fastest-rotating one of said wheels, and characterized in that said fourth means includes means utilizing said reference signal in conjunction with said output signal to provide said anti-skid control.*

*25. In an anti-skid system for a rotatable wheel of a vehicle having a plurality of wheels having associated therewith a brake and a brake-application control device, the combination of:*

*first means, including coil means associated with a first one of the said wheels and means whereby a magnetic field is created in the proximity of said coil means, said first means being such that a fluctuating potential proportional to wheel speed is produced in said coil means incident to rotation of said first one of the said wheels;*

*second means, including circuit means connected to said coil means, adapted to produce an electric signal in response to said fluctuating potential, which signal is related to the frequency of the fluctuations of the fluctuating potential; and*

*third means, including electrical means connected to said circuit means and including electrically operable valve-controlling means in said electrical means, effective in response to said electric signal to operate the brake-application control device to partially reduce the braking force acting on said wheel to avoid skidding of said wheel.*

*26. In a system as defined in claim 25, characterized in the provision of electrical differentiating means in said circuit means for producing a signal representative of the rate of change of frequency of the fluctuations of the fluctuating potential, and in which said electrical means includes means responsive to said signal to produce a brake application control electric signal, and being further characterized in that said coil means is effective to produce the aforesaid fluctuating potential in response to change of the magnetic field in the proximity of said coil means incident to rotation of said first one of said wheels relative to said coil means.*

*27. In a brake-control system for a vehicle having at least first and second independent load-supporting wheel units each comprising a respective wheel having an associated brake and a brake-applying means and a brake-application-control means effective upon energization thereof to relax brake-application in an amount proportional to the magnitude of energization, the combination:*

*first and second wheel-speed-sensing and signal means, each for and associated with a respective one of said wheels and each effective to provide during ro-*

*tation of the wheel an electrical signal representative of the rotational speed of the respective wheel;*

*electrical means connected to said speed-sensing and signal means for providing an electrical signal representative of the speed of the fastest-rotating one of said wheels during rotation of any thereof; and*

*means, connected to said brake-application-control means and to said first wheel-speed-sensing and signal means and to said electrical means and responsive to the difference between the provided electrical signal representative of the speed of the fastest-rotating one of said wheels and the electrical signal representative of the rotational speed of said first wheel when the latter is not the fastest-rotating one of said wheels, to energize said brake-application-control means to effect relaxation of the brake associated with said first wheel.*

*28. A brake-control system for a vehicle having independently-rotatable vehicle wheels each having a respective fluid-operable brake means associated therewith, said system comprising in combination with said wheels and brake means:*

*first means, including for each one of said wheels and associated therewith a respective first electrical means for producing an electrical potential proportional to the speed of the associated wheel;*

*second means, connected to said first means, including means for storing a potential equal to the potential produced by that one of said electric signal means associated with the fastest one of said wheels;*

*third means, including for each one of said first electrical means a second electrical means associated therewith and each connected to said second means and to the respective one of said first electrical means, each of said second electrical means being effective in response to production by the associated first electrical means of a potential less than the potential stored by said second means to produce an energizing effect; and*

*fourth means, including an electrically-operable valve means operatively associated with at least that fluid-operable brake means associated with one of said wheels whose speed is less than that of the fastest one of said wheels and said valve means electrically connected to said third means and effective to operate in response to production of said energizing effect to partially relax said last-mentioned fluid-operable brake means, whereby said one of said wheels is permitted to accelerate.*

*29. In an anti-skid system for a wheel of a vehicle having at least first and second independently-rotatable wheels the combination of:*

*first means providing an electrical coil in a magnetic field encircling a continuing portion of a low reluctance path of said magnetic field;*

*second means, including operable means associated with said first of said wheels and said first means, effective to modulate the reluctance of said low reluctance path of said magnetic field for producing electrical fluctuations in said electrical coil the frequency of which is proportional to the rotational speed of said first one of said wheels;*

*third means, associated with said first means and said second means, effective to produce in response to said electrical fluctuations an electrical output signal having a variable characteristic bearing a known relationship to the frequency of said electrical fluctuations; and*

*fourth means, connected to said third means and including control means utilizing said output signal to partially reduce braking force on said first wheel incident to a change in a characteristic of said electrical fluctuations.*

*30. The combination as defined in claim 29 characterized in that said third means includes means for producing a reference signal representative of the rotational speed of the fastest-rotating one of said wheels, and characterized in that said fourth means includes means utilizing said reference signal in conjunction with said output signal to provide said anti-skid control.*

*31. In an anti-skid system for a wheel of a vehicle having at least first and second independently-rotatable wheels the combination of:*

*first means providing an electrical field coil for generating a magnetic field when electrical current is passed through said coil and further providing a low reluctance path for said magnetic field, said field coil encircling a portion of said low reluctance path;*

*second means for supplying electrical current for passage through said field coil;*

*third means, including operable means associated with said first of said wheels and said first means effective to modulate the reluctance of said low reluctance path of said magnetic field for producing electrical fluctuations in said field coil the frequency of which is proportional to the rotational speed of said first one of said wheels;*

*fourth means, associated with said first means, effective to produce in response to said electrical fluctuations an electrical output signal bearing a known relationship to the frequency of said electrical fluctuations; and*

*fifth means, connected to said fourth means and including control means utilizing said output signal to provide anti-skid control for said first wheel incident to a change in a characteristic of said electrical fluctuations.*

*32. The combination as defined in claim 31, characterized in that said fourth means includes means for producing a reference signal representative of the rotational speed of the fastest-rotating one of said wheels, and characterized in that said fifth means includes means utilizing said reference signal in conjunction with said output signal to provide said anti-skid control.*

*33. A brake-control system for a vehicle having at least first and second principal load-supporting wheels each having associated brake means, said system comprising:*

*first means including at each of said first and second wheels respective electric means effective to provide a signal at frequencies proportional to instantaneous rotational wheel speeds and also including respective electric brake application control means for controlling the corresponding brake means;*

*second means including in electrical association with each of said first means a respective electric means including circuit means responsive to the frequency of said rotational wheel speed signal to provide and store a respective electric charge of potential proportional to the frequency of said wheel speed signal;*

*third means including electric circuit means common to all said electric means and including a reference charge-storing means connected to each of said several electric means and effective to be charged to a reference potential equal to the highest instantaneous potential among the stored charges of said several circuit means; and*

*fourth means comprising control means including means for dissipating the charge of said reference charge-storing means at a predetermined rate and including also means responsive to a difference of potential between said reference potential and that of an electric charge stored in one of said circuit means and effective to apply electric energy to the corresponding wheel to vary the braking effort thereof, thereby to equalize the rotational speed of said wheels.*

*34. In a brake control system for a vehicle having first and second independently-rotatable load-bearing wheels with respective brake means, the combination comprising:*

*first and second electrical signal generating means associated, respectively, with said first and second wheels*

*for producing first and second electrical signals which vary in frequency as a function of the speeds of said first and second wheels, respectively;*

*first and second electrical converter means connected, respectively, to said first and second electrical signal generating means for converting said first and second electrical signals to first and second electrical potentials which vary in amplitude as a function of the frequencies of said first and second electrical signals, respectively;*

*common reference means operatively connected to said first and second electrical converter means for producing a varying common reference potential representative of vehicle speed;*

*means for dissipating said common reference potential at a rate representing a predetermined rate of vehicle deceleration; and*

*means responsive to a predetermined differential-relationship between said common reference potential and said first and/or second electrical potential to reduce application of braking effort at said first and/or second wheel, respectively.*

*35. The combination defined in claim 34 wherein said common reference means is a charge-storing means which charges at a rapid rate to the higher of said first and second electrical potentials.*

*36. The combination defined in claim 34 wherein said means responsive to a predetermined differential-relationship between said common reference potential and said first and/or second electrical potential is effective to reduce application of braking effort at said first and/or second wheel by an amount which is a function of the difference*

*between said common reference potential and said first and/or second electrical potential.*

*37. The combination defined in claim 36 wherein the brake means for each of said first and second wheels is controllable independently of the other by independent means responsive to a predetermined differential-relationship between said common reference potential and an associated one of said first and second electrical potentials.*

References Cited

The following references, cited by the Examiner, are of record in the patented file of this patent or the original patent.

UNITED STATES PATENTS

| | | | |
|---|---|---|---|
| 2,173,946 | 9/1939 | McCune | 303—21A |
| 2,515,729 | 7/1950 | Morrison | 303—21BEX |
| 3,060,602 | 10/1962 | Buttenhoff | 303—21BE |
| 1,459,397 | 6/1923 | Herrmann | 336—135 |
| 2,283,608 | 5/1942 | McCune | 303—21 |
| 2,294,610 | 9/1942 | Sorensen | 303—21 |
| 2,980,369 | 4/1961 | Ruof | 244—111 |
| 3,017,145 | 1/1962 | Yarber | 244—111 |
| 2,788,186 | 4/1957 | Wilson | 244—111 |

OTHER REFERENCES

May, C. F. and Toney, H.: The Prevention of Wheel-lock During Braking on Railway Rolling Stock, September 1954, Lucas Technical Review, pp. 33–42.

DUANE A. REGER, Primary Examiner

UNITED STATES PATENT OFFICE

CERTIFICATE OF CORRECTION

Patent No. Re. No. 27,168 Dated September 20, 1971

Inventor(s) Bernard B. Thompson et al.

It is certified that error appears in the above-identified patent and that said Letters Patent are hereby corrected as shown below:

Column 12, line 67, "of the frequency" should read -- to the frequency --. Column 13, line 17, "frequnecy" should read -- frequency --; line 47, "threby" should read -- thereby --; line 58, "circuits" should read -- circuit --. Column 14, line 20, "appreciable" should read -- appreciably --; line 41, after "means" cancel "and responsive at the commencement of each of" and insert -- connected to all said speed sensing and indicating--.

Signed and sealed this 26th day of September 1972.

(SEAL)
Attest:

EDWARD M.FLETCHER,JR.
Attesting Officer

ROBERT GOTTSCHALK
Commissioner of Patents

USCOMM-DC 60376-P69
☆ U.S. GOVERNMENT PRINTING OFFICE : 1969 O—366-334.